United States Patent Office 3,567,714
Patented Mar. 2, 1971

3,567,714
N-(OXA- OR THIACYCLOALKYL)METHYL-5-SUL-
FAMOYLANTHRANILIC ACID DERIVATIVES
James W. Wilson, Wayne, Pa., assignor to Smith Kline &
French Laboratories, Philadelphia, Pa.
No Drawing. Filed Sept. 3, 1965, Ser. No. 485,116
Int. Cl. C07d 5/04, 7/04, 63/04, 65/04
U.S. Cl. 260—239.6
6 Claims

ABSTRACT OF THE DISCLOSURE

Anthranilic acid derivatives, prepared by reacting a 2-halo-4-chloro(or bromo, fluoro or trifluoromethyl)-5-sulfamoylbenzoic acid or ester with an N-[(oxa- or thiacycloalkyl)methyl]amine, have diuretic and natriuretic activity and are useful in treating hypertension.

This invention relates to new N-(oxa- or thiacycloalkyl)methyl-5-sulfamoylanthranilic acid derivatives having pharmacodynamic activity, in particular, diuretic activity. The compounds of this invention have natriuretic activity and also are useful in treating hypertension.

The new compounds of this invention are represented by the following formula:

FORMULA I

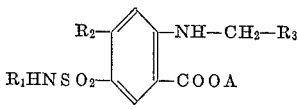

in which:

A is hydrogen or lower alkyl;
$R_1$ is hydrogen or lower alkyl;
$R_2$ is chloro, bromo, fluoro or trifluoromethyl;
$R_3$ is

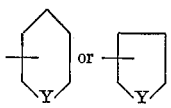

and
Y is oxygen or sulfur.

Preferred compounds of this invention are compounds of Formula I in which $R_3$ is

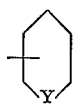

Advantageous compounds of this invention are represented by the following formula:

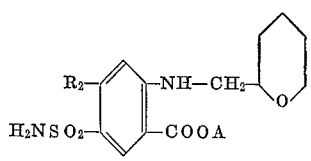

in which:

A is hydrogen or lower alkyl and
$R_2$ is chloro or trifluoromethyl.

The term "lower alkyl" where used herein denotes groups having 1 to 6, preferably 1 to 4, carbon atoms.

Also included in this invention are carboxylic acid salts of the anthranilic acids of Formula I prepared by reacting the carboxylic acid with an inorganic or organic base such as an alkali metal hydroxide, for example, sodium or potassium hydroxide, ammonia or benzylamine.

The compounds of this invention are prepared by the following procedure:

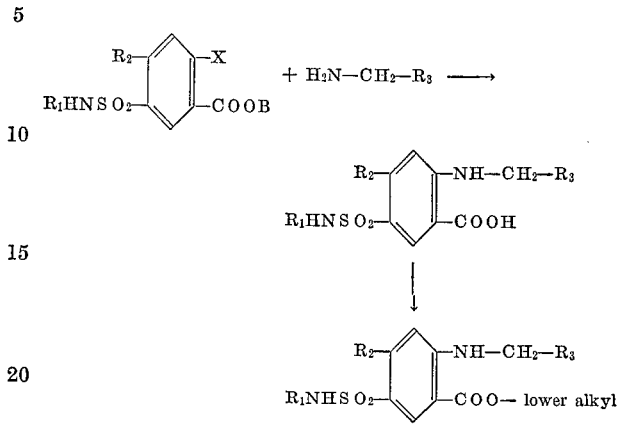

The terms $R_1$, $R_2$ and $R_3$ are as defined above, B is hydrogen or lower alkyl and X is chloro, bromo or fluoro chosen so that when $R_2$ is chloro, X is chloro or fluro; when $R_2$ is bromo, X is chloro, bromo or fluoro and when $R_2$ is fluoro, X is fluoro.

According to the above procedure, a 2-halo-4-$R_2$-5-sulfamoylbenzoic acid or lower alkyl ester thereof is reacted with an appropriate amine ($H_2N$—$CH_2$—$R_3$). The reaction is carried out at elevated temperature in a suitable solvent such as methoxyethanol or the dimethyl ether of diethylene glycol. An excess of the amine is used, in particular, where a benzoic acid is used. In the case of the lower alkyl esters, a suitable less reactive organic base such as triethylamine may be employed in the reaction as an acid acceptor.

The anthranilic acid esters of this invention are prepared by esterification of the anthranilic acids such as by heating the acid with an excess of a lower alkanol in the presence of a mineral acid such as sulfuric acid or by conversion of the acid to the acid chloride with thionyl chloride in chloroform and subsequent alcoholysis of the acid chloride.

The 2-halo-4-$R_2$-5-sulfamoylbenzoic acid and lower alkyl ester starting materials are either known to the art or are prepared by procedures I or II as follows:

I:

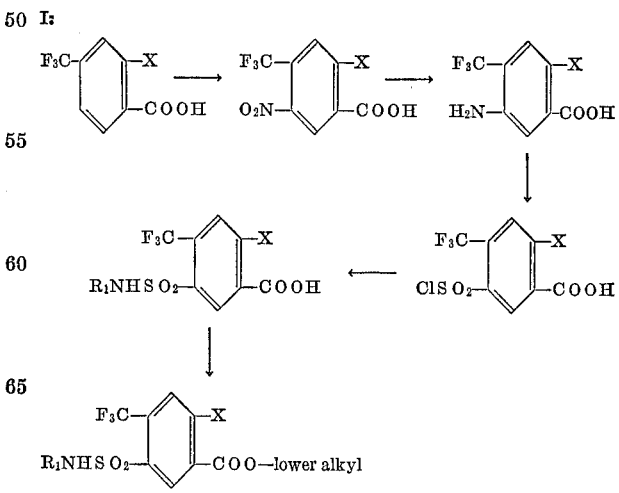

The term $R_1$ is as defined above and X is chloro, bromo or fluoro.

II.

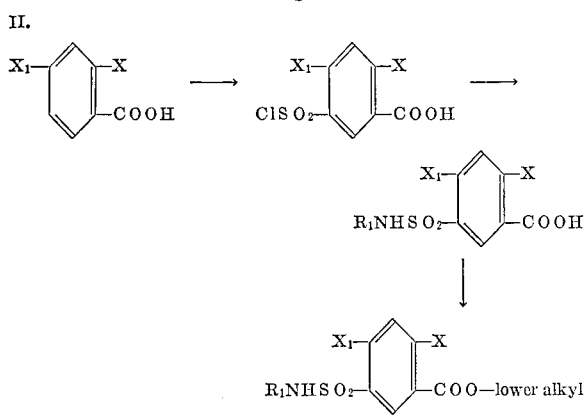

The term $R_1$ is as defined above and $X_1$ and X are chloro, bromo or fluoro chosen so that when $X_1$ is chloro, X is chloro or fluoro; when $X_1$ is bromo, X is chloro, bromo or fluoro and when $X_1$ is fluoro, X is fluoro.

According to procedure I, a 2-halo-4-trifluoromethylbenzoic acid is treated with fuming sulfuric acid and fuming nitric acid to give a 2-halo-5-nitro-4-trifluoromethylbenzoic acid. The nitro group is reduced by treating with a chemical reducing agent such as iron powder in aqueous ammonium chloride to give a 5-amino-2-halo-4-trifluoromethylbenzoic acid. Treating this amino compound with concentrated hydrochloric acid and sodium nitrite followed by a solution of sulfur dioxide in acetic acid containing cuprous or cupric chloride and treating the resulting 5-chlorosulfonyl compound with ammonium hydroxide or with an alkylamine gives a 2-halo-5-sulfamoyl-4-trifluoromethylbenzoic acid. Esterifying the benzoic acid by heating with an excess of a lower alkanol in the presence of a mineral acid such as sulfuric acid gives the lower alkyl ester.

According to procedure II, a 2,4-dihalobenzoic acid is heated with an excess of chlorosulfonic acid and the resulting 5-chlorosulfonyl compound is treated with ammonium hydroxide or with an alkylamine to give a 2,4-dihalo-5-sulfamoylbenzoic acid. The lower alkyl ester is prepared by heating the benzoic acid with an excess of a lower alkanol in the presence of a mineral acid such as sulfuric acid.

The amine starting materials ($H_2N$—$CH_2$—$R_3$) are either known to the art or are prepared by the following procedures or by other methods known to the art:

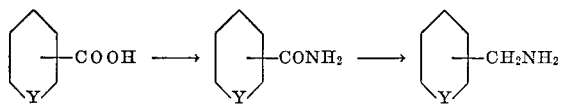

The term Y is as defined above.

According to the above procedure, a tetrahydropyrancarboxylic acid or tetrahydrothiapyrancarboxylic acid is converted to the carboxylic acid amide, for example, by esterifying the carboxylic acid to give the methyl ester or by converting the carboxylic acid to the carboxylic acid chloride, for example using thionyl chloride, and then treating the ester or carboxylic acid chloride with ammonia or by reacting the carboxylic acid or its tertiary amine salt with ethyl chloroformate and treating the resulting mixed anhydride with ammonia. The carboxylic acid amide is reduced, for example, with a bimetallic hydride such as lithium aluminum hydride to give the tetrahydropyranyl (and thiapyranyl) methylamine starting materials.

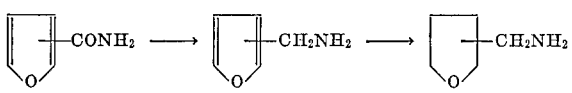

By the above procedure, the amide group is reduced, for example, with a bimetallic hydride such as lithium aluminum hydride and the furyl ring is reduced to tetrahydrofuryl by hydrogenation in the presence of a catalyst such as Raney nickel.

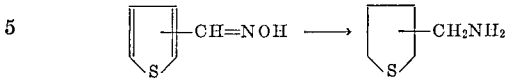

According to the above procedure, a thiophene-3-carboxaldehyde oxime is reduced using sodium-mercury amalgam and water.

The following examples are not limiting but are illustrative of the compounds of this invention.

EXAMPLE 1

To a suspension of 29.8 g. of methyl 2,4-dichloro-5-sulfamoylbenzoate in 84 ml. of dimethyl ether of diethylene glycol is added 84 ml. of triethylamine and 16.8 ml. of 2-tetrahydropyranylmethylamine. The mixture is refluxed with stirring for three hours and then 450 ml. of water and 450 ml. of ether are added slowly. The resulting mixture is then acidified with hydrochloric acid. The ether layer is separated, washed with hydrochloric acid and water and extracted with 0.5 N potassium hydroxide solution and the aqueous potassium hydroxide solution is allowed to stand overnight at room temperature. Ethyl acetate (400 ml.) is added to this extract and the resulting mixture is slowly acidified to pH 3.5 with acetic acid. The mixture is shaken and the ethyl acetate layer is extracted with saturated sodium bicarbonate solution. The sodium bicarbonate extract is acidified with hydrochloric acid to pH 5.5. The precipitate is isolated by filtration, redissolved in aqueous sodium bicarbonate and reprecipitated with hydrochloric acid and then recrystallized from ethyl acetate to give 4-chloro-5-sulfamoyl-N-(2-tetrahydropyranylmethyl)anthranilic acid.

EXAMPLE 2

Five grams of 2-bromo-4-trifluoromethylbenzoic acid is added with stirring to 31 g. of fuming 30% sulfuric acid. To this mixture is added dropwise 7.7 g. of fuming nitric acid keeping the temperature below 70° C. The mixture is heated with stirring on a steam bath for two hours, then treated with a large excess of ice water and filtered to give 2-bromo-5-nitro-4-trifluoromethylbenzoic acid.

To a mixture of 4.8 g. of iron powder and a solution of 2.5 g. of ammonium chloride in 40 ml. of water at 50° C. is added 4.5 g. of 2-bromo-5-nitro-4-trifluoromethylbenzoic acid. The resulting mixture is heated on a steam bath with stirring for three hours, then treated with 10% sodium carbonate, filtered, neutralized with concentrated hydrochloric acid, allowed to stand, cooled and filtered to give 5-amino-2-bromo-4-trifluoromethylbenzoic acid.

To a suspension of 4.3 g. of 5-amino-2-bromo-4-trifluoromethlybenzoic acid in 10 ml. of concentrated hydrochloric acid at 6° C. is added slowly with stirring a solution of 1.4 g. of sodium nitrate in 60 ml. of water. The resulting cold mixture is poured with stirring into 15 ml. of a saturated solution of sulfur dioxide in 15 ml. of acetic acid containing 0.2 g. of cuprous chloride. The solid material is filtered off, washed with water and then added with stirring to an excess of ammonium hydroxide. After stirring at room temperature for two hours, the solution is made acid with concentrated hydrochloric acid and the 2-bromo-5-sulfamoyl-4-trifluoromethylbenzoic acid is filtered off, washed with water and dried.

To a solution of 4.98 g. of 2-tetrahydropyranylmethylamine in 15 ml. of the dimethyl ether of diethylene glycol is added 3.0 g. of 2-bromo-5-sulfamoyl-4-trifluoromethylbenzoic acid. The mixture is refluxed for one hour under nitrogen. The mixture is cooled and poured into hydrochloric acid. The precipitate is filtered off, then dissolved in ethanol-water (1:1), treated with charcoal and filtered.

Cooling and filtering gives 5-sulfamoyl-4-trifluoromethyl-N-(2-tetrahydropyranylmethyl)anthranilic acid.

A sample of this acid is treated with an equimolar amount of potassium hydroxide in water to give, after evaporating the water in vacuo, the potassium salt of 5-sulfamoyl - 4 - trifluoromethyl-N-(2-tetrahydropyranylmethyl)anthranilic acid.

EXAMPLE 3

To a solution of 10.8 g. of 2,4-dichloro-5-sulfamoylbenzoic acid in 55 ml. of 2-methoxyethanol is added 20 g. of 2-tetrahydrofurylmethylamine. The resulting mixture is refluxed under nitrogen for five hours with stirring, then poured into 300 ml. of 1 N hydrochloric acid and chilled. The precipitate is collected by filtration, then dissolved in saturated sodium bicarbonate solution. The solution is treated with charcoal, filtered and acidified to pH 4 to 4.5. The precipitate is collected by filtration, dried and recrystallized from wet ethyl acetate to give 4-chloro-5-sulfamoyl-N-(2-tetrahydrofurylmethyl)anthranilic acid.

Treating a sample of the above prepared anthranilic acid with an equimolar amount of benzylamine in methanol at room temperature gives, after evaporating the methanol in vacuo, the benzylamine salt of 4-chloro-5-sulfamoyl-N-(2-tetrahydrofurylmethyl)anthranilic acid.

EXAMPLE 4

Five grams of 2-bromo-5-sulfamoyl-4-trifluoromethylbenzoic acid (prepared as in Example 2) is added to 7.26 g. of 2-tetrahydrofurylmethylamine in 25 ml. of the dimethyl ether of diethylene glycol. The resulting mixture is heated at reflux under nitrogen for one hour, cooled and poured into 300 ml. of 1 N hydrochloric acid. The mixture is stirred for several minutes at room temperature and the precipitate is filtered off, dried and recrystallized from ethanol-water to give 5-sulfamoyl-4-trifluoromethyl - N-(2-tetrahydrofurylmethyl)anthranilic acid.

EXAMPLE 5

To 13.1 g. of 4-chloro-sulfamoyl-N-(2-tetrahydropyranylmethyl)anthranilic acid (prepared as in Example 2) in 100 ml. of cold methanol is added 4.0 ml. of concentrated sulfuric acid. The mixture is heated at reflux for four hours. On concentrating, cooling and filtering methyl 4-chloro-sulfamoyl-N-(2-tetrahydropyranylmethyl)anthranilate is obtained.

Similarly, using ethanol in place of methanol in the above procedure, the ethyl ester of 4-chloro-5-sulfamoyl-N-(2-tetrahydropyranylmethyl)anthranilic acid is obtained.

In the same manner, using n-butanol in place of methanol in the above procedure, the product is n-butyl 4-chloro - 5 - sulfamoyl-N-(2-tetrahydropyranylmethyl)anthranilate.

Using n-hexanol in place of methanol in the above procedure, the product is n-hexyl 4-chloro-5-sulfamoyl-N-(2-tetrahydropyranylmethyl)anthranilate.

EXAMPLE 6

A mixture of 16.2 g. of 2,4-difluorobenzoic acid and 58 g. of chlorosulfonic acid is heated to 160° C., then cooled and poured into ice water. Filtering gives 2,4-difluoro-5-chlorosulfonylbenzoic acid. Treating this 5-chlorosulfonyl compound with a cold aqueous methanol solution of methylamine, then concentrating the mixture in vacuo, acidifying with hydrochloric acid and filtering gives 2,4-difluoro-5-methylsulfamoylbenzoic acid.

By the procedure of Example 3, 20 g. of 2-tetrahydropyranylmethylamine is added to 9.4 g. of 2,4-difluoro-5-methylsulfamoylbenzoic acid in 55 ml. of 2-methoxyethanol and the resulting mixture is heated at reflux under nitrogen with stirring for five hours. The mixture is poured into 300 ml. of 1 N hydrochloric acid and worked up as in Example 3 to give 4-fluoro-5-methylsulfamoyl - N - (2-tetrahydropyranylmethyl)anthranilic acid.

EXAMPLE 7

To a solution of 3.7 g. of 2-bromo-5-(n-butyl)sulfamoyl-4-trifluoromethylbenzoic acid (prepared as in Example 2 using an excess of n-butylamine in ethanol in place of ammonium hydroxide) in 15 ml. of the dimethyl ether of diethylene glycol is added 5.8 g. of 2-tetrahydropyranylmethylamine. The mixture is heated at reflux under nitrogen for two hours, then cooled and poured into hydrochloric acid to give, after working up as in Example 2, 5-(n-butyl)sulfamoyl-4-trifluoromethyl-N-(2-tetrahydropyranylmethyl)anthranilic acid.

Using an excess of n-hexylamine in place of n-butylamine in the above procedure gives 5-(n-hexyl)sulfamoyl - 4 - trifluoromethyl-N-(2-tetrahydropyranylmethyl) anthranilic acid.

EXAMPLE 8

To a solution of 14.6 g. of 2-tetrahydrothiopyrancarboxylic acid in 100 ml. of toluene is added 10.1 g. of triethylamine. To this mixture at −5° C. to −10° C. is added dropwise with stirring 10.9 g. of ethyl chloroformate. After stirring at 0° C. for 30–60 minutes the triethylamine hydrochloride which forms is removed by filtration. To the filtrate is added at 0° C. with stirring a solution of an excess of ammonia in toluene. The resulting toluene solution after standing at 0–30° C. for several hours is washed with water and with a dilute aqueous solution of sodium carbonate. The toluene is removed in vacuo to give 2-tetrahydrothiapyrancarboxylic acid amide.

Lithium aluminum hydride (8.36 g.) is crushed under dry ether and then stirred under reflux with 400 ml. of dry ether for two hours. After cooling to 0° C., a solution of 16.0 g. of 2-tetrahydrothiapyrancarboxylic acid amide in 100 cc. of dry ether is added dropwise with stirring. After completion of the addition, the mixture is refluxed for 30–60 minutes, then cooled to 0° C. Water (8 ml.) is added dropwise with stirring followed by 6 ml. of 6 N sodium hydroxide and then an additional 28 ml. of water. The organic layer is separated and dried over anhydrous sodium sulfate. The sodium sulfate is removed by filtration, the solvent is removed in vacuo and the residue distilled to give 2-tetrahydrothiapyranylmethylamine.

To 28.4 g. of methyl 2,4-dichloro-5-sulfamoylbenzoate in 80 ml. of the dimethyl ether of diethylene glycol is added 80 ml. of triethylamine and 19.7 g. of 2-tetrahydrothiapyranylmethylamine. The mixture is heated at reflux for three hours, then 450 ml. of water and 450 ml. of ether are added slowly and the resulting mixture is acidified with hydrochloric acid and worked up as in Example 1 to give 4-chloro-5-sulfamoyl-N-(2-tetrahydrothiapyranylmethyl)anthranilic acid.

EXAMPLE 9

Using 8.4 g. of 2-tetrahydrothienylmethylamine in place of 2-tetrahydrofurylmethylamine in the procedure of Example 4, 5-sulfamoyl-4-trifluoromethyl-N-(2-tetrahydrothienylmethyl)anthranilic acid is obtained.

EXAMPLE 10

A mixture of 20 g. of 3-tetrahydropyrancarboxylic acid, 100 ml. of methanol and 5 ml. of concentrated sulfuric acid is refluxed for two hours, then cooled and filtered to give methyl 3-tetrahydropyrancarboxylate.

To 100 ml. of a saturated solution of ammonia in methanol is added 14.4 g. of methyl 3-tetrahydropyrancarboxylate. The resulting solution is kept at room temperature for three days. Removal of the solvent and excess ammonia in vacuo gives 3-tetrahydropyrancarboxylic acid amide.

The above prepared 3-tetrahydropyrancarboxylic acid amide is reduced by the procedure of Example 8 using lithium aluminum hydride in dry ether to give 3-tetrahydropyranylmethylamine.

By the procedure of Example 1, using 28.4 g. of methyl 2,4-dichloro-5-sulfamoylbenzoate in 80 ml. of the dimethyl ether of diethylene glycol, 80 ml. of triethylamine and 17 g. of 3-tetrahydropyranylmethylamine, 4-chloro-5-sulfamoyl-N-(3-tetrahydropyranylmethyl)anthranilic acid is obtained.

Similarly, as above, using 19.7 g. of 3-tetrahydrothiapyranylmethylamine (prepared from 3-tetrahydrothiapyrancarboxylic acid as in Example 8), 4-chloro-5-sulfamoyl-N-(3-tetrahydrothiapyranylmethyl)anthranilic acid is obtained.

EXAMPLE 11

To a solution of 8.36 g. of lithium aluminum hydride in 125 ml. of tetrahydrofuran at 0–5° C. is added dropwise with stirring a solution of 11.1 g. of 3-furancarboxylic acid amide. After heating at 60° C. with stirring for 45 minutes, the mixture is cooled at 0° C. The following are added successively and dropwise with stirring and cooling: 8 ml. of water, 6 ml. of 6 N sodium hydroxide and 28 ml. of water. The tetrahydrofuran solution is decanted and dried over anhydrous sodium sulfate. The sodium sulfate is removed by filtration and the solvent is removed in vacuo and the residue is distilled to give 3-furylmethylamine.

To a solution of 30 g. of 3-furylmethylamine in 150 ml. of dioxane is added 9 g. of Raney nickel. This mixture is hydrogenated at 1000–3000 p.s.i. and 120–180° C. for two hours. After filtering off the catalyst, removing the solvent in vacuo and distilling the residue in vacuo, 3-tetrahydrofurylmethylamine is obtained.

Ten grams of 3-tetrahydrofurylmethylamine is added to a solution of 5.4 g. of 2,4-dichloro-5-sulfamoylbenzoic acid in 30 ml. of 2-methoxyethanol. Refluxing the mixture under nitrogen for five hours with stirring, then pouring the mixture into 150 ml. of 1 N hydrochloric acid and working up as in Example 3 gives 4-chloro-5-sulfamoyl-N-(3-tetrahydrofurylmethyl)anthranilic acid.

EXAMPLE 12

To a mixture of 5 g. of 3-thiophenecarboxaldehyde oxime, 40 ml. of water and 30 ml. of 95% ethanol is added gradually with stirring at a temperature of 80° C. 2300 g. of 2.5% sodium-mercury amalgam and from time to time sufficient water to kep the mixture fluid (total amount of water is 1200 ml.). After standing for 24 hours, volatile material is distilled off. The distillate is neutralized with hydrochloric acid and concentrated in vacuo to a small volume. Excess potassium hydroxide is added and the mixture is extracted with ether. The extracts are concentrated and distilled to give 3-tetrahydrothienylmethylamine.

By the procedure of Example 3, using 11.6 g. of 3-tetrahydrothienylmethylamine and 5.4 g. of 2,4-dichloro-5-sulfamoylbenzoic acid in 30 ml. of 2-methoxyethanol, 4-chloro-5-sulfamoyl-N - (3-tetrahydrothienylmethyl)anthranilic acid is obtained.

EXAMPLE 13

By the procedure of Example 2, 3.0 g. of 2-bromo-5-sulfamoyl-4-trifluoromethylbenzoic acid is added to 4.98 g. of 4-tetrahydropyranylmethylamine in 15 ml. of the dimethyl ether of diethylene glycol. The mixture is refluxed under nitrogen for one hour, then cooled and poured into hydrochloric acid to give, after working up as in Example 2, 5-sulfamoyl-4-trifluoromethyl-N-(4-tetrahydropyranylmethyl)anthranilic acid.

EXAMPLE 14

By the procedure of Example 1, using 37 g. of methyl 2,4-dibromo-5-sulfamoylbenzoate (prepared by heating 2,4-dibromo-5-sulfamoylbenzoic acid with methanol in the presence of sulfuric acid) in 80 ml. of the dimethyl ether of diethylene glycol, 80 ml. of triethylamine and 17 g. of 2-tetrahydropyranylmethylamine, 4-bromo-5-sulfamoyl-N-(2-tetrahydropyranylmethyl)anthranilic acid is obtained.

What is claimed is:

1. A compound of the formula:

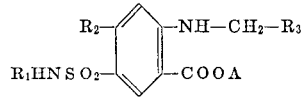

in which:
A is hydrogen or lower alkyl;
$R_1$ is hydrogen or lower alkyl;
$R_2$ is chloro, bromo, fluoro or trifluoromethyl;
$R_3$ is

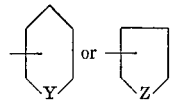

Y is oxygen or sulfur, except that when $R_2$ is chloro or bromo, $R_3$ is not

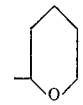

or, when A is hydrogen, a pharmaceutically acceptable carboxylic acid salt thereof and
Z is oxygen or sulfur except that Z is not oxygen when $R_2$ is chloro, bromo or fluoro.

2. A compound of the formula:

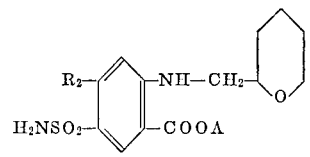

in which:
A is hydrogen or lower alkyl and
$R_2$ is trifluoromethyl.

3. A compound of the formula:

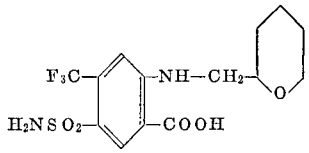

4. A compound of the formula:

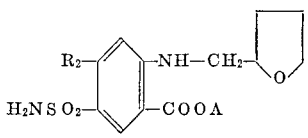

in which:
A is hydrogen or lower alkyl and
$R_2$ is trifluoromethyl.

5. A compound of the formula:

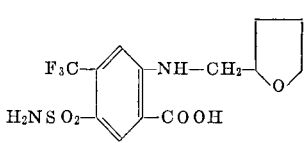

6. 2-(3-tetrahydropyranylmethylamino)-4-chloro-5-sulfamylbenzoic acid.

(References on following page)

References Cited

UNITED STATES PATENTS 3,058,882  10/1962  Strum et al. _____ 260—239.6

FOREIGN PATENTS 965,089  7/1964  Great Britain _____ 260—239.6

OTHER REFERENCES

Yale: J. Med. and Pharm. Chem., vol. 1, pp. 121–33 (1959).

HENRY R. JILES, Primary Examiner

H. I. MOATZ, Assistant Examiner

U.S. Cl. X.R.

260—515, 518, 470, 329, 345.1, 347.7, 999

PO-1050
(5/69)

UNITED STATES PATENT OFFICE
CERTIFICATE OF CORRECTION

Patent No. 3,567,714          Dated March 2, 1971

Inventor(s) James W. Wilson

It is certified that error appears in the above-identified patent and that said Letters Patent are hereby corrected as shown below:

Column 8, lines 29-32, should read as follows:

and Z is oxygen or sulfur except that Z is not oxygen when $R_2$ is chloro, bromo or fluoro or, when A is hydrogen, a pharmaceutically acceptable carboxylic acid salt thereof.

Signed and sealed this 22nd day of June 1971.

(SEAL)
Attest:

EDWARD M. FLETCHER, JR.          WILLIAM E. SCHUYLER, JR
Attesting Officer                Commissioner of Patents